United States Patent [19]

Chandler

[11] Patent Number: 5,634,743
[45] Date of Patent: Jun. 3, 1997

[54] LINING OF PIPELINES AND PASSAGEWAYS

[75] Inventor: Brian B. Chandler, Steinermark, Austria

[73] Assignee: Sound Pipe, Ltd., Grand Turk, Turks/Caicos Islands

[21] Appl. No.: 509,648

[22] Filed: Jul. 31, 1995

[30] Foreign Application Priority Data

Jun. 10, 1995 [GB] United Kingdom ............... 9511834

[51] Int. Cl.$^6$ .................................................. E02D 11/00
[52] U.S. Cl. ........................ 405/150.1; 405/155; 138/98; 156/294
[58] Field of Search ............................. 156/94, 71, 287, 156/294; 405/150.1, 155; 138/97, 98; 428/36.1, 36.2

[56] References Cited

U.S. PATENT DOCUMENTS

| 3,860,565 | 1/1975 | Barber, Jr. ............... 260/77.5 NC |
| 4,009,063 | 2/1977 | Wood ..................... 405/150.1 X |
| 4,064,211 | 12/1977 | Wood ..................... 405/150.1 X |
| 4,135,958 | 1/1979 | Wood ..................... 405/150.1 X |
| 4,456,401 | 6/1984 | Williams ................. 405/150.1 |
| 4,602,974 | 7/1986 | Wood et al. ............. 405/150.1 X |
| 4,836,715 | 6/1989 | Wood ..................... 405/150.1 |

*Primary Examiner*—William P. Neuder
*Attorney, Agent, or Firm*—Cowan, Liebowitz & Latman, P.C.; Michael I. Wolfson

[57] ABSTRACT

The lining of pipelines and passageways is effected by everting a flexible lining tube containing curable synthetic resin into and along the pipeline or passageway. The resin is of the latent type and requires the application of energy to initiate the cure, after which the cure continues. The cure is initiated by applying energy, e.g. ultrasonic, to the everting face via a device which travels in the pipeline or passageway ahead of the everting face. The device is kept centralised and focuses energy on the center of the everting face. As the respective lengths of the lining pass the everting face and lie on the pipeline or passageway surface they cure to hard condition. The process is dynamic and quick.

11 Claims, 4 Drawing Sheets

LINING OF PIPELINES AND PASSAGEWAYS

BACKGROUND OF THE INVENTION

This invention relates to the lining of pipelines and passageways wherein a flexible tubular liner is everted into and along the pipeline or passageway. The flexible tubular liner includes a curable synthetic resin material such as an epoxy, a polyester, or a phenolic resin and wherein the resin is caused to cure after the flexible tubular lining has been inflated by fluid pressure against the surface to be lined. The fluid pressure may be applied by any suitable medium such as a gas, vapour or liquid or any combination thereof. When the resin cures, the initially flexible lining forms a hard rigid pipe on the pipeline or passageway surface. The resulting pipe may be free standing, or when it is of relatively small thickness, it may form a coating bonded to the pipeline or passageway surface.

Lining methods as described are known, and were first proposed in U.S. Pat. No. 4,064,211. In the method adopted in said U.S. patent, the curing of the synthetic resin is effected by circulating hot water through the inflated lining and the heat in the water effects curing of the synthetic resin. The trouble with heat curing of the resin is that on the one hand curing takes a long time, and on the other hand the resin which was used namely a polyester resin, was in a formulation such that the resin has a relatively short pot life after mixing with a catalyst for the resin.

More recently, attention has been given to the creation and utilization of "latent" resin systems which are systems having a long pot life e.g. measured in terms of months rather than days, as is the case with polyester, but which latent resin systems can be activated in order to cause them to cure by the application of an appropriate activating influence. The activating influence may comprise for example ultrasonic vibrations, or electromagnetic radiation, or light cure, the resin system being appropriately formulated to be activated by these means.

In the prior U.S. patent furthermore the lining tube is provided with a carrier material typically a polyester felt which is impregnated with the resin, and serves to carry the resin and keep it evenly distributed throughout the circumferential length of the lining tube, but more recently, proposals have been made for providing that the resin (with fibrous reinforcement therein if required) is contained between a pair of films so that a fibrous felt may not be necessary.

Additionally, the means suggested for the curing of latent resin systems in lining tubes has been the passage of said means through the tube, after it has been inflated.

OBJECTIVES OF THE INVENTION

An objective of the invention is to provide an efficient and quick method of curing lining tubes as they are being everted into pipeline or passageway surfaces.

A further objective is to simplify the use of a curing device in a pipeline or passageway.

A further objective is to use a source of high intensity energy focussed on a lining tube for the curing of synthetic resin forming a part thereof; enabling the use of a small energy generating device.

A still further objective is to provide a method whereby a latent resin system for the lining can be used and activated reliably whilst the lining is being everted onto the pipeline or passageway surface.

A further objective is to provide for the effective utilization of the available energy to enhance the curing and to limit loss of the energy along the pipeline.

SUMMARY OF THE INVENTION

The present invention represents a considerable departure from the established methods and the aforesaid proposals and provides that a flexible lining tube is everted into and along a pipeline or passageway, said lining tube including a curable synthetic resin, and wherein the activating means for curing the resin is applied to the everting face of the lining tube as it passes along the pipeline or passageway.

It can be seen that the method represents a considerable departure from established practise. The activating means can be any suitable depending upon the nature of the resin matrix which is used. The resin which is used can be of any formulation for example as disclosed in any of the following patent applications; International Patent Applications Nos WO 95/01861; WO 95/01860; UK Patent Applications Nos 940734.8; 9416906.7; 9409014.9; 9415318.6; 9421369.1; European Patent Application No 0621883.

Where the resin is a heat cure resin, the activating means can comprise the application of heat to the everting face. This could be applied by means of hot liquid or by a hot plate type member which contacts the everting face. The temperature of the fluid or hot plate can be selected to give a fast 1296 Hc intiation so that after the heat is applied, the resin will continue curing after the lining tube has been applied to the pipeline or passageway surface.

In a preferred arrangement, the activating means travels along the pipeline or passageway in advance of the everting face, and in a particularly preferred arrangement the activating means applies ultrasonic vibrations to the everting face at sufficient frequency and power to cause activation of the cure of the resin which will be specially formulated to be responsive to ultrasonic vibrations. Thus, the resin may comprise a resin matrix containing absorbent particles or fibres in which catalyst and/or accelerator is absorbed, for example as described in International patent application WO 95/01861, or alternatively the resin may include microcapsules in which the catalyst and/or accelerator is contained, and in these cases either the absorbent particles or fibres are vibrated, shattered or broken by means of the ultrasonic energy or the microcapsules are ruptured by the energy but in either case the catalyst is released into the resin at the everting face, and initiation of the cure will take place. The cure in each section of the lining tube will continue after it has been applied to the pipeline or passageway surface so that eventually the lining will form a hard rigid lining pipe on the passageway surface.

Preferably, the cure system will be such as to cause fast curing of the resin i.e. within a time period of half an hour to one hour, which should make the installation process much quicker than the conventional process in which hot water is used to cure the lining.

The ultrasonic generator may be arranged to be kept slightly spaced from the everting face of the lining tube to prevent scorching of the lining tube on the everting face.

The resin may in another embodiment embody electromagnetic particles which can be activated by an electromagnetic field or microwave generator, which is arranged to apply an alternating magnetic field to the everting face of the lining tube in order to activate the magnetic particles to cause heating of same.

Any combination of these resin systems and activating means can be adopted, and the invention provides particular advantage insofar as a single activating means arranged in front of the everting face can be adopted. It is not necessary that the activating means should be of a size closely matched to the inner diameter of the pipeline or passageway and in fact it can be made considerably smaller which means that it can be moved easily through the pipeline or passageway. It may be provided with a support spider or other means to keep the activating means centrally located in the pipeline or passageway as it moves therealong.

Where a heat activated resin is utilized, heat may be applied by means of a hot fluid spray or by means of a hot plate.

The method should provide that curing can be effectively controlled and provides the advantage that a curing activation step is only performed on the everting face immediately prior to the application of the lining tube to the pipeline or passageway surface, and therefore there is little danger of the resin in the lining curing prematurely i.e. before it is applied to the pipeline or passageway surface. After the lining is so applied it is desirable that curing should take place as quickly as possible.

The process can be enhanced by providing reflective means behind or to the rear of the everting force so that energy which is transmitted through the resin in everting face which be reflected through the said resin ensuring maximised use of that energy for curing purposes. The reflective means may suitably comprise a reflective film, being for example, a metallised plastic film or a metal foil which initially is to the outside of the lining tube, but everts with it as it is everted into position.

As an alternative or in addition, a reflective shield can be moved along the inside of the pipeline behind the everting face.

Embodiments of the present invention will now be described, by way of example, with reference to the accompanying drawings, wherein.

Figure 1:
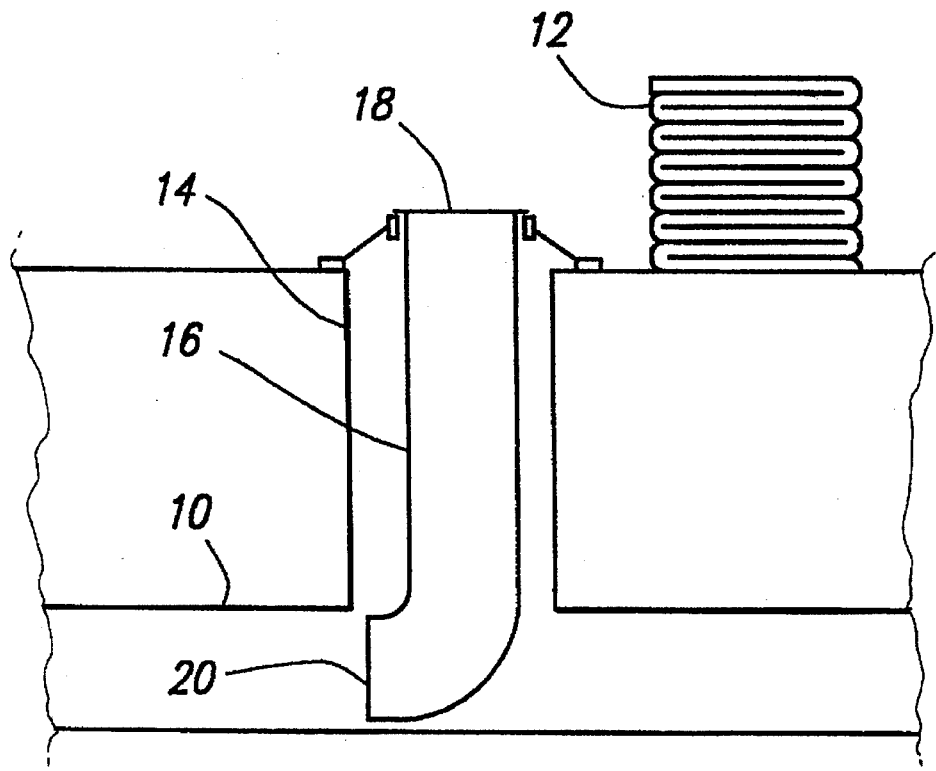
FIG. 1 shows a section of underground sewer to be lined through a manhole which is also shown.

Referring to the drawings, in FIG. 1 is shown an underground sewer 10 which is to be lined by means of a resin impregnated lining tube 12, by the feeding of same through a manhole 14 leading from ground level where the tube 12 is stored to the underground level of sewer 10. In the manhole 12 is an elbow pipe 16 through which the lining tube is fed as will be explained, the elbow pipe 16 having a top end 18 and a lower elbow end 20 the outlet for which faces into and along the sewer 10.

Figure 2:
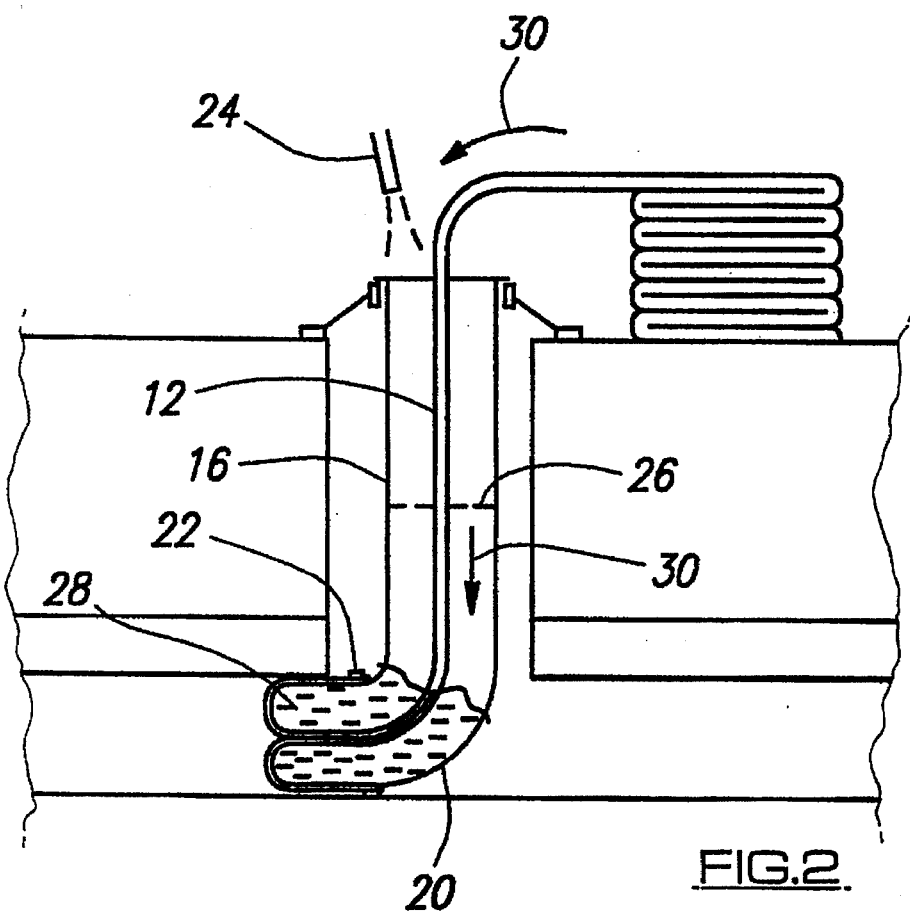
FIG. 2 shows a view similar to FIG. 1, but showing also the basic lining operation.

In order to feed the lining tube through the elbow pipe 16 and to evert it along the sewer 10 to line same, the leading end of the tube 12 is fed through the interior of the elbow pipe 16 as shown in FIG. 2, and then the said leading end is cuffed backwards so as to overlie the outlet end 20 of the elbow pipe 16 as shown in FIG. 2. The said leading end is clamped by a suitable clamp means 22, and in order to perform the eversion, in this example water is filled into the elbow pipe 16 as indicated by water outlet 24 until the water reaches a level in the elbow pipe indicated by reference 26.

With this arrangement, the water 28 inside the cuffed back leading end of the lining tube 12 causes the tube to be fed from ground level as indicated by arrows 30 into and along the sewer 10 so that the lining tube 12 is everted onto the surface of the sewer by the pressure of the water 28. The feed of the lining tube into and along the sewer 10 may be controlled by a holding force applied to the lining tube. Thus procedure is called "bottom end" eversion as the tube 12 is connected to the bottom end of pipe 16. The tube 12 can be connected to the tope end of tube 16, in which case the procedure is "top end" eversion.

The lining tube 12 in this example comprises at least one layer of resin absorbent material such as a needled felt, surrounded on the outside by an impermeable film or coating keeping the water 28 out of contact with the resin. As the tube turns inside out as shown in FIG. 2 however the outer coating becomes the inner surface of the inflated lining tube.

All of the above described technology is prior art, and in order to cure the resin in the lining tube in the known method, the water 28 when the lining tube has been fully installed is replaced by hot water which circulates through the inflated tube and the heat from the water cures the resin of the lining tube as it is held inflated on the sewer surface.

The problem with this method is that the cure time is very long insofar as it can take eight to ten hours in order to cure the resin sufficiently for the water to be removed and the ends of the lining tube to be trimmed in order to complete the installation.

Also, in the conventional method, the resin used typically is polyester, and it has a relatively short pot life (up to several days if it is kept refrigerated) and therefore the known method does not lend itself to the adoption of latent resin systems on the one hand, and fast cure on the other hand.

Figure 3:
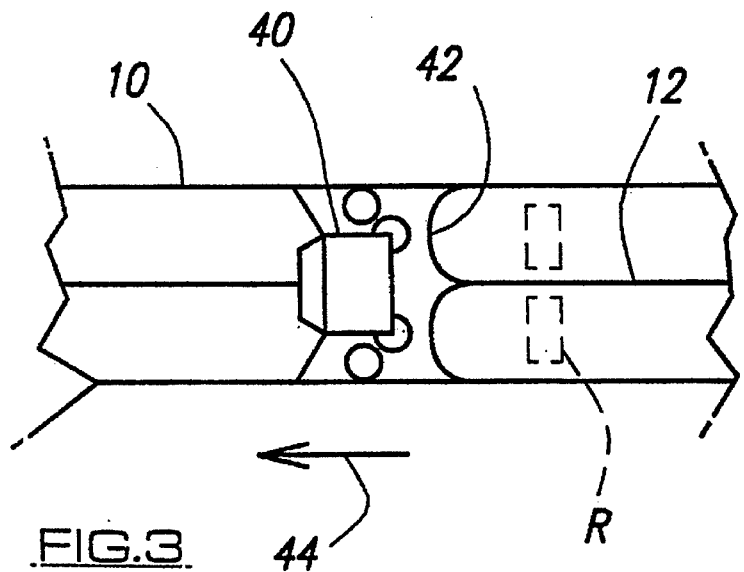
FIG. 3 is a diagrammatic view showing the lining being installed and being preceded by an ultrasonic generating device.

The method according to the present invention does however lend itself to these requirements, and in the embodiment of the invention illustrated, as indicated in FIG. 3, an ultrasonic generator 40 moves along the sewer 10 in front of the everting face 42. The generator 40 moves in the direction of arrow 44 as does the everting face 42, and as the ultrasonic generator moves it emits ultrasonic vibrations in the opposite direction i.e. directly onto the everting face in order to activate the resin in the lining tube 12.

The resin will be suitably formulated so that it is "kicked" into curing activity by the application of the energy of the ultrasonic vibrations. The energy applied will be sufficient to initiate the cure in the resin, but cure will continue after the lining tube 12 has been applied to the sewer surface or in other words after it has been everted.

Figure 5:
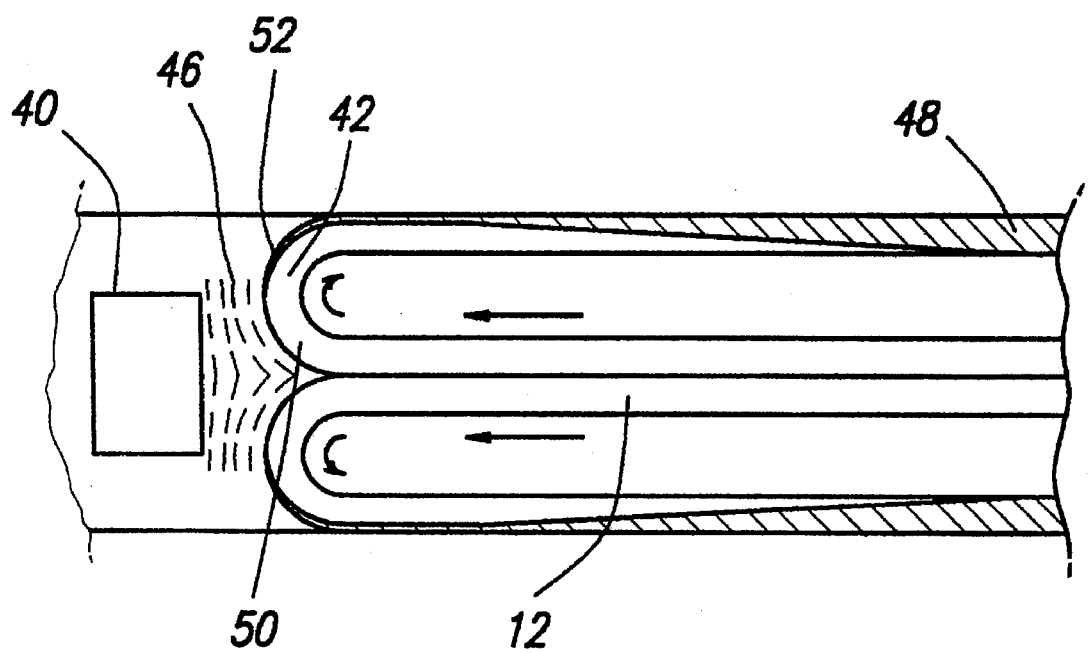
FIG. 5 is a sectional view showing how the lining cures after activation by the ultrasonic device.

FIG. 5 is a graphic illustration of how curing takes place, and referring to that figure, the ultrasonic generator 40 emits ultrasonic vibrations as indicated by reference 46 onto the everting face 42. The cross hatching on the lining tube 12 is intended to indicate the extent of cure of the lining tube at each location. Thus, at location 48 the resin has completely cured, whereas at the centre of the everting face as indicated by reference 50 no curing has yet taken place. When the radiation falls on the everting face, cure commences and this is indicated by a relatively small thickness of cross hatching 52 at said everting face and the thickness of the cross hatching increases progressively from location 52 to location 48. The distance between these two locations may represent in order of half and hour to one hours travel of the everting face, indicating that cure is effected within a period of half and hour to one hour. Although the cross hatching is shown as increasing in thickness from the everting face location 52 to location 48, in fact the extent of cure will be homogeneous throughout the thickness of the lining and the degree of cure will be least at location 52 and greatest or fully cured at location 48.

Figure 4:
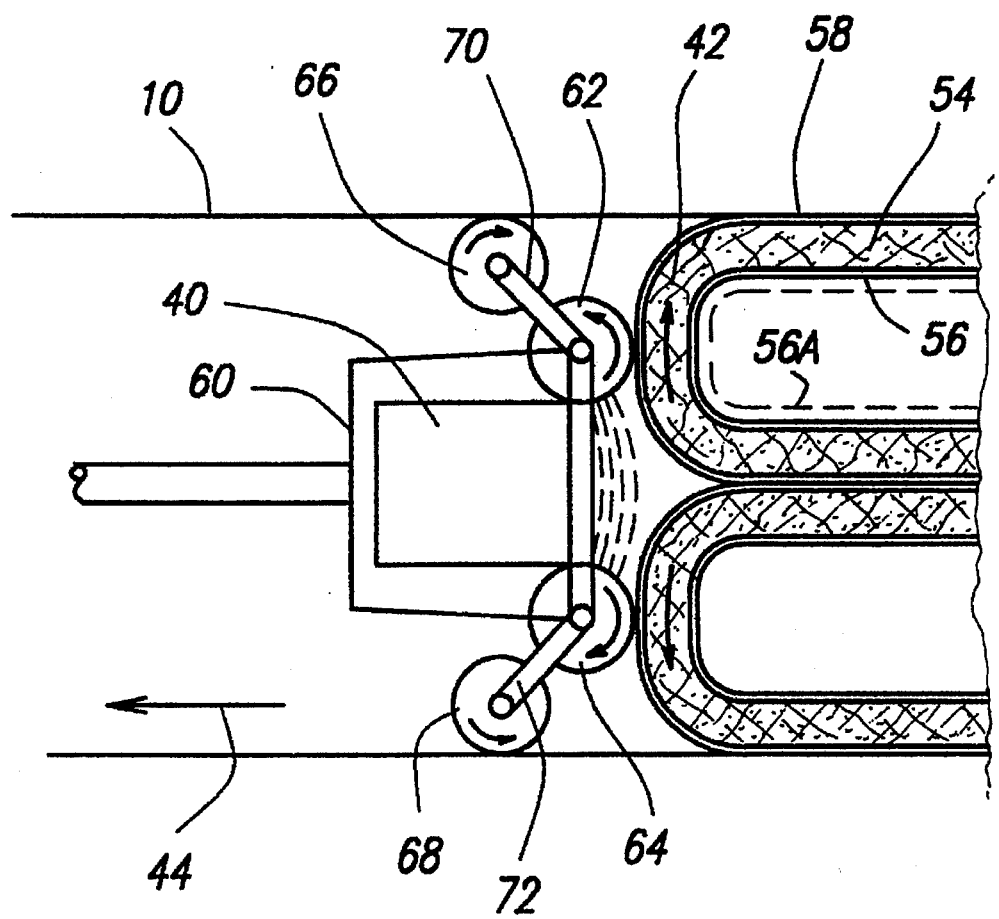
FIG. 4 is a view similar to FIG. 3 but to a considerably enlarged scale for the purposes of explanation.

FIG. 4 shows in greater detail the arrangement at the everting face 42. It is to be noted from FIG. 4 that the lining material comprises a central layer 54 containing the resin and felt if provided, a first protective film layer 56 and a second protective film layer 58, the layers 56 and 58 lying to opposite sides of the resin layer 54. Layer 56 is initially to the outside of the lining tube in the stored position shown in FIG. 1, whilst layer 58 is to the inside when in this position, but after eversion the positions of the layers reverse as can be seen from FIG. 4.

The layer 54 may not necessarily include a felt but may comprise simply a resin matrix with a filler substance such as loose fibres and other filler materials.

The resin however is likely to include particles either in the form of absorbent particles in which catalyst and/accelerator is absorbed, or microcapsules in which catalyst and/or accelerator is contained, and the energy from the ultrasonic generator 40 is such as to fracture or rupture these particles to allow release of the catalyst and/or accelerator in order to cause the cure initiation as explained herein.

The position for the ultrasonic generator 40 from the everting face 42 will be calculated to be the optimum, and at present it is believed that it is not desirable to have the face of the ultrasonic generator in contact with the everting face 42 (unless there is a film of oil on the face) so that scorching at such face 42 can be avoided. In the diagrammatic arrangement shown in FIG. 4, a novel drive means is shown in that the ultrasonic generator 40 is carried by a frame 60 on which pulleys 62 and 64 are rotatably mounted. These pulleys press on the everting face and serve two functions namely to keep the ultrasonic generator 40 at a predetermined distance from the everting face 42, and secondly to provide a drive transmission to gear wheels 66 and 68 paired with the wheels 62 and 64. These pairs are carried by spring loaded arms 70 and 72 which are spring loaded so as to project the gear wheels 66 and 68 outwards towards the surface of the sewer 10 to engage same. As the everting face moves and eversion proceeds, so the pulleys 62 and 64 are driven in the directions indicated by the arrows. Rotation of pulleys 62 and 64 causes rotation of the gear wheels 66 and 68 which in turn drive against the sewer 10 as indicated by the arrows, and cause the assembly including the ultrasonic generator 40 to move rearwards as indicated by the arrow 44 at the same speed as the everting face. The wheel pairs 64 and 68 and 62 and 66 also serve as a centering means for the ultrasonic generator 40.

It may be desirable to flood the space containing the ultrasonic generator 40 with water, or to provide a rolling pig filled with water in order to provide an effective transmission of energy from the ultrasonic generator to the everting face of the lining tube.

After the lining tube has been everted onto the pipeline or passageway with the method described, it may be desirable to send a further cure initiation means through the inside of the tube in order to further accelerate the cure. In this connection, hot water may be used for the eversion process or after completion of eversion, the heat in the water serving to enhance or accelerate the cure.

Figure 6:
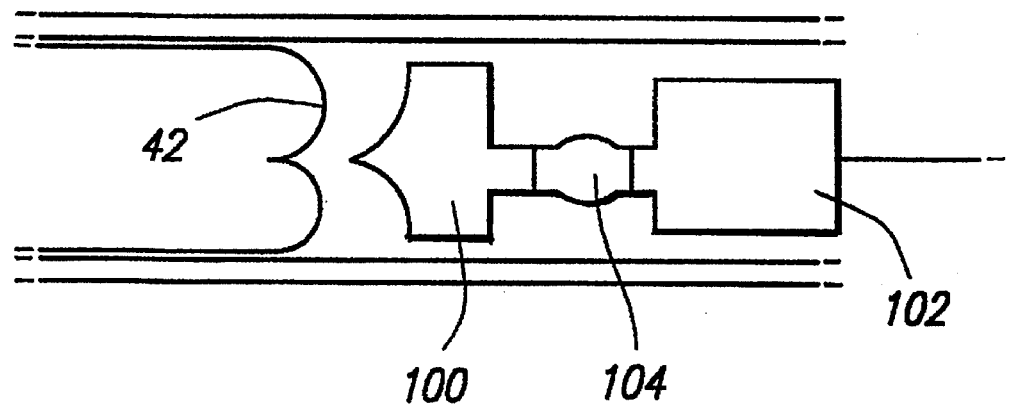
FIGS. 6, 7 and 8 are diagrammatic views of three activating arrangements.
Figure 7:
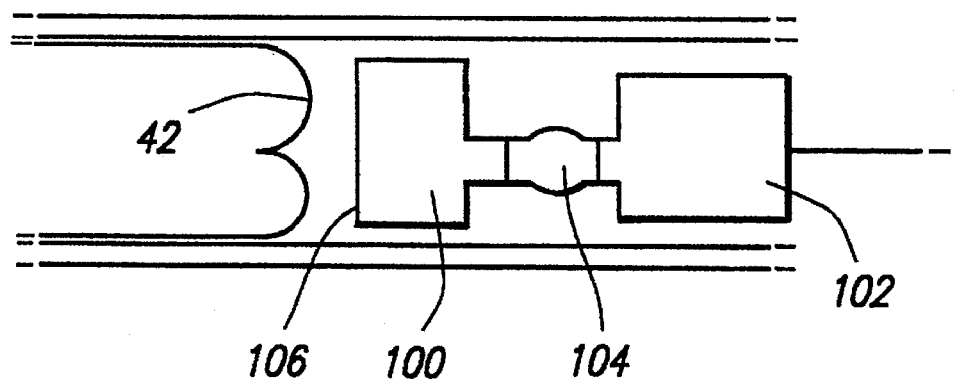
Figure 8:
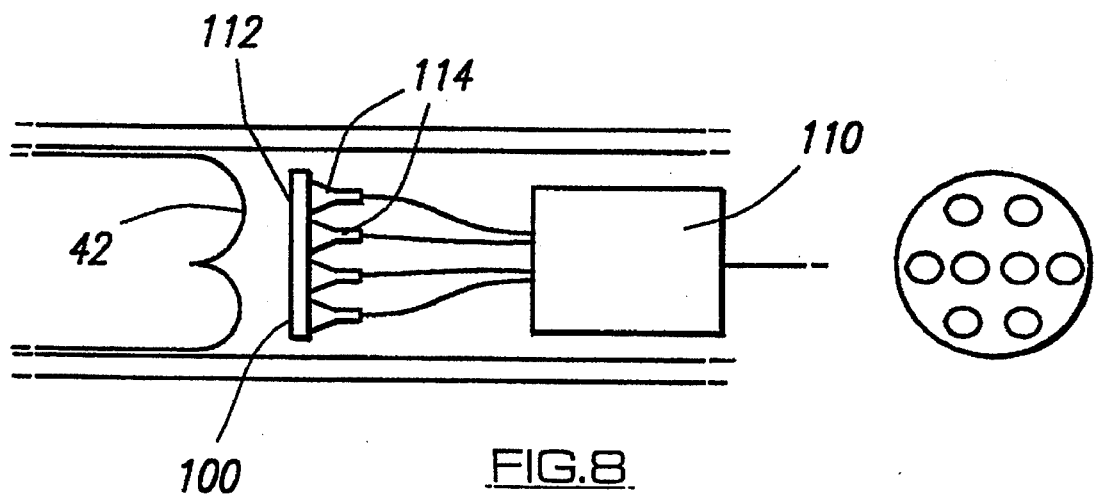

FIGS. 6, 7 and 8 show various activating arrangements. Each includes an activating head 100, which in the case of FIGS. 6 and 7 comprises an energy delivering horn driven by a transducer 102 through a booster 104. In FIG. 6, the horn 100 is shaped to conform to the shape of the everting face 42 as shown, whilst in FIG. 7 the horn energy delivering face 106 is flat. The generators of FIGS. 6 and 7 are for small diameter pipes e.g. 10 cm approx, and may be microwave or ultrasonic, whereas the arrangement of FIG. 8 comprises an ultrasonic apparatus for larger diameter pipes.

The arrangement of FIG. 8 comprises a generator 110, a vibrator plate 112 arranged in front of the everting face 42 and a plurality of generators 114 welded on the rear of plate 110 in the pattern shown and connected to be driven by the generator 110. Each of the arrangements operates as described herein by emitting radiation onto the everting face 42.

The method of the invention has wide application. Thus, it is not necessary that the lining tube should be provided with inner and outer plastic films or coatings. The method can be used when the tube is as is conventional provided with only an outer film.

Secondly, it is not necessary that ultrasonics be used for initiating the cure. Any suitable means can be used such as lights, electromagnetic radiation, mechanical means (for rupturing particles containing catalyst and/or accelerator) or heat can be applied to the everting face. The heat may be applied in the nature of steam or hot water of sufficient temperature to ensure that the curing is commenced.

As described, the effecting of the cure at the everting face can be used in conjunction with steps to effect enhancement of the cure before or after insertion of the lining tube.

As indicated herein, the maximum utilization of energy can be effected by providing an energy reflective means to the rear of the everting face so that energy which passes through the everting face will be reflected back into the everting face from the rear; thus provides maximum curing effect on the resin. This energy reflection may be achieved in any suitable way such as by providing an energy reflective shield R (shown in dotted lines in FIG. 3) behind the everting face, but a preferred method is to provide the tube 12 itself on its outer surface (before eversion) with a reflective coating or layer, which everts with the tube 12. Thus, the layer 56 may be a metallised film or an additional film (metallised) such as film 56A (shown in dotted lines in FIG. 4) may be applied to the tube, the metallising in each case providing a means to reflect any energy, especially ultrasonic energy, back into the everting face, should to pass completely through said everting face. A metal foil layer may be used for the same purpose.

Also, a layer which absorbs energy and heats up as a result may also be useful on the rear of the everting face, as the reformed heat therein will assist in the curing step and will continue so to do after the material has passed the everting face and has in the pipeline surface.

The method of the invention has a number of considerable advantages as follows:

1. The activation means can be pulled or driven through the pipeline or passageway ahead of the everting tube, making it easy to locate and position.
2. The energy applying device can be easily centralized, and it is required to direct the energy axially of the sewer. Therefore, the energy can be concentrated on the everting face, meaning that a small device with high energy output can be used.
3. Because of the application of the intense energy on the everting face, curing initiation can be reliably commenced, and the cure can be completed naturally whilst the lining tube is held to the pipeline or passageway surface and in the preferred arrangement no further steps for enhancing the cure will be necessary, as the cure will take place naturally especially where catalyst is released by the application of the energy.

4. Linings with latent resin systems can be used and they can therefore be manufactured and stored a long time before application.

5. The method can be carried out much quicker than the conventional method improving the lining efficiency.

6. Lining tubes which do not embody any felt can be used readily in the process.

I claim:

1. A method of lining a pipeline or passageway with a flexible tubular lining including curable resin, comprising the steps of
   a) everting the lining into and along the pipeline or passageway; and
   b) applying resin cure initiating energy to the everting face of the lining as it passes along the pipeline or passageway.

2. The method of claim 1, wherein the resin is of the latent type and includes catalyst and/or accelerator which is prevented from contacting the resin, and including the step of using said energy to release the said catalyst and/or accelerator into the resin to initiate cure thereof.

3. The method of claim 2, including the step of using ultrasonic energy as said cure initiating energy.

4. The method according to claim 3, including the step of moving an ultrasonic generator means to focus high intensity ultrasonic energy at the everting face.

5. The method according to claim 4, including the step of maintaining the ultrasonic generator means spaced from the everting face by a predetermined distance.

6. The method according to claims 4 or 5, including the step of using an ultrasonic transducer of power 500 W at 20 kHz.

7. The method according to claim 1 or 2 including the step of using an energy applying device which focuses radiation energy on the centre of the everting face, and including the step of keeping the said device centrally located in the pipeline or passageway as it moves therealong ahead of the everting face.

8. The method according to claim 7, wherein the said device generates ultrasonic energy.

9. The method according to claim 7, wherein the said device generates microwave energy.

10. The method of claim 1 including the step of using heat as said cure initiating energy.

11. The method according to claim 1 or 2 including the step of reflecting energy which passes through the everting face back to the everting face.

* * * * *